UNITED STATES PATENT OFFICE.

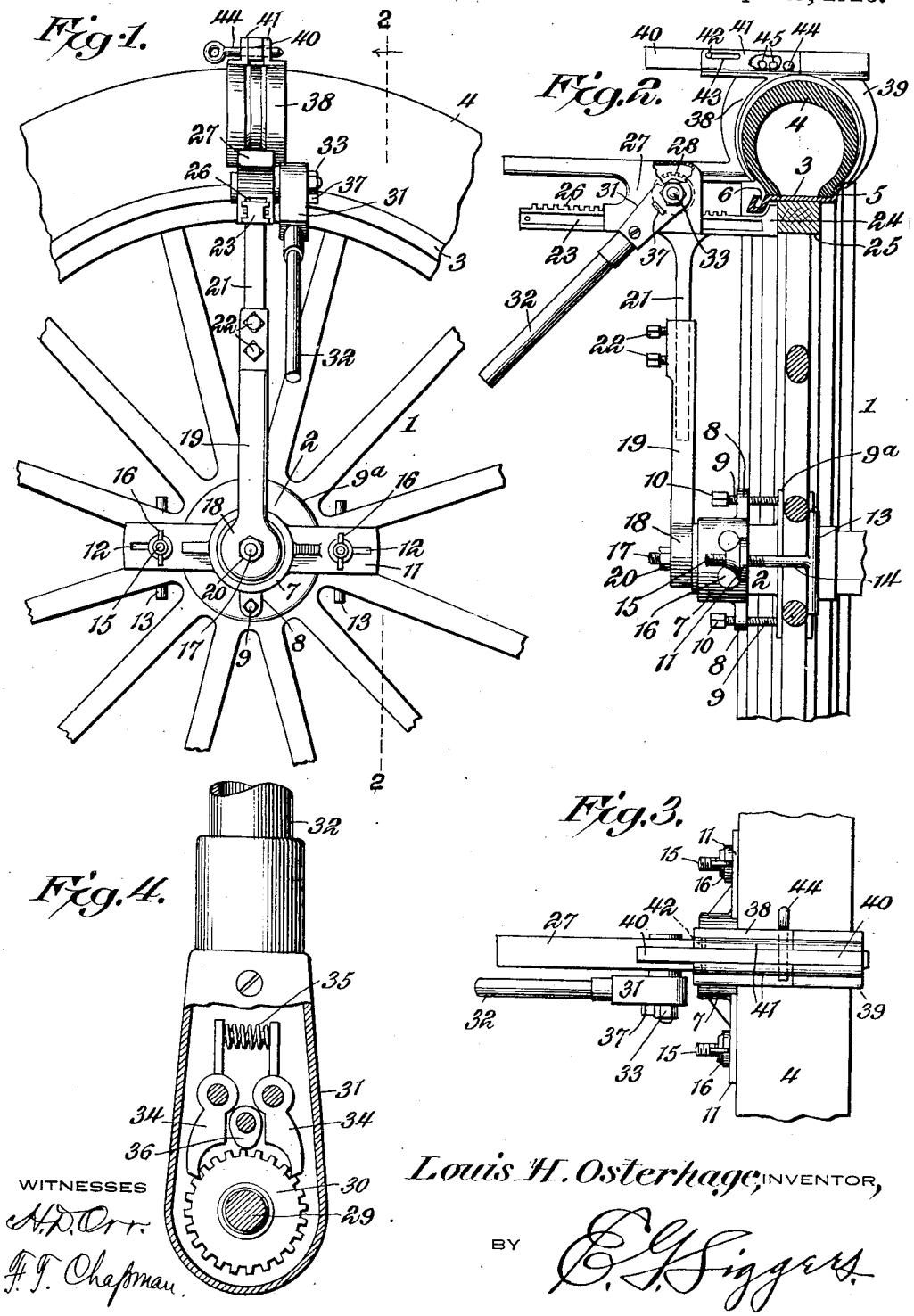

LOUIS H. OSTERHAGE, OF VINCENNES, INDIANA.

AUTOMOBILE-TIRE TOOL.

1,336,916. Specification of Letters Patent. Patented Apr. 13, 1920.

Application filed February 19, 1919. Serial No. 277,989.

*To all whom it may concern:*

Be it known that I, LOUIS H. OSTERHAGE, a citizen of the United States, residing at Vincennes, in the county of Knox and State of Indiana, have invented a new and useful Automobile-Tire Tool, of which the following is a specification.

This invention has reference to automobile tire tools, and its object is to provide a tool whereby tires may be readily removed from the rims of the wheels or replaced thereon, whether the tire be pneumatic or solid.

In accordance with the invention, the tool is provided with a clamp member attachable to the hub portion of the wheel, with a part capable of turning about the axis of the wheel, and having a tire-engaging portion so made as to embrace the tire but not tight enough to prevent the embracing portion from moving along the tire. In order to remove the tire from the rim actuating means are provided with sufficient power to easily pull the tire sidewise from the rim or to push it onto the rim. The tire-engaging portion of the tool is so arranged as to have orbital movement about the hub clamp and also to pull or push on the tire away from or toward the wheel.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is a front elevation of an automobile wheel provided with a pneumatic tire and having the tire tool or jack applied thereto.

Fig. 2 is a section on the line 2—2 of Fig. 1.

Fig. 3 is a plan view of the structure of Fig. 1 but showing a less extent of wheel.

Fig. 4 is a fragmentary view, partly in section and on a larger scale than the other views, of a ratchet propelling device used in connection with the invention.

Referring to the drawing, there is shown an automobile wheel 1 having a hub 2, rim 3 and a pneumatic tire 4, which latter may be taken as representative of a solid tire as well as a pneumatic tire. The rim 3 and tire 4 are shown as of the quick detachable type where the tire abuts on one side against a fixed flange 5 and the rim on the other side is provided with a depressed groove or socket 6 for the reception of a locking ring. With such a rim the tire is moved onto the rim from one side and is withdrawn from the rim from the same side. Such tires are often difficult of removal because of accumulations of rust or the like causing the tire to persistently stick to the rim and rendering removal a difficult job. Frequently it is necessary to use a heavy hammer or mallet to loosen the tire and this is injurious both to the machine and the tire. It is also quite frequently necessary, where other means are not available, to pry the tire loose from the rim by means of a screw-driver or a prying tool of some form.

There is provided a cup 7 adapted to be placed over the outer end of the hub 2 of the wheel and this cup is provided with diametrically opposite ears 8 through which are threaded set screws 9 each having a squared or other suitably shaped head 10 for the application of a suitable tool. The ears 8 and set screws 9 are so located that the set screws will bear against the usual hub flange 9$^a$. Projecting oppositely from the cup 7 are arms or brackets 11 each with a longitudinal slot 12 near its outer end and so situated as to be opposite a space between two adjacent wheel spokes. Arranged to span the same two spokes is a T-hook 13 having a stem 14 adapted to pass through the slot 12 and having a threaded end 15 to which there is applied a wing nut 16. The arrangement is such that with T-hooks on opposite sides of the hub and passing through the slots 12 in the arms 11 and with the wing nuts applied to the T-hooks the cup 7 may be quickly and firmly attached to the wheel and held against rotation thereon, the attachment being made more secure by the set screws 9 bearing against the hub flange in opposition to the holding effect of the T-hooks.

The cup 7 is provided with an axially projecting threaded stem 17 to which is applied the hub end 18 of a radial arm 19. The hub 18 is held to the cup 7 by a nut 20 applied to the threaded stem 17 but in such manner that the arm 19 may be easily turned about the axis of the stem 17. The outer end of the arm 19 is socketed for the telescoping reception of a bar 21 which, when seated in the arm 19, prolongs the latter in the same radial direction as the arm. Set screws 22 serve to hold the bar 21 in the arm 19 in any adjusted position to prolong or shorten the arm within the limits of the device.

Fast to the bar 21 is an elongated head 23 which may be of I-form, although such particular form is not obligatory. The head 23 is provided at one end with an abutting enlargement or lug 24 shaped to bear against the felly 25 of the wheel 1 adjacent to the socket portion 6 of the rim 3. The head 23 is also provided on the edge remote from the bar 21 with a longitudinal series of rack teeth 26. Applied to the head 23 so as to slide lengthwise and engage in the channels on opposite sides of the bar is a casing 27 in which there is mounted a gear wheel 28 on a spindle or shaft 29 journaled in the sides of the casing and projecting from one side thereof. The projecting portion of the spindle 29 carries a ratchet wheel 30 inclosed by a housing 31 provided with a handle 32 and held to the shaft 29 by a nut 33. Within the housing 31 are oppositely operating dogs 34 having a normal tendency toward the ratchet 30 imparted by a spring 35 common to them. A cam 36 controlled by a manipulating button 37, on it and accessible at the exterior of the housing 31, permits an operator to throw one or the other of the dogs 34 out of action so that the lever 32 may be actuated as a ratchet lever turning the gear wheel 28 in one direction or the other as desired and thereby moving the casing 27 correspondingly.

Arranged to embrace the tire 4 are opposed jaws 38, 39, one provided with a tangential bar 40 and the other with guides 41 mounted to embrace the bar 40 and slide thereon, but the extent of sliding movement may be limited by a pin 42 on the bar 40 and a longitudinally extended groove or grooves 43 on the guides 41. The jaws 38 and 39 are held in their closest position of approach by another pin 44 passed through matching perforations in the bar 40 and guides 41. In order that the spacing of the jaws 38 and 39 may be changed to accommodate the device to tires of different sizes, a suitable number of holes 45 are provided in the bar 40 for the pin 44. The jaw 38 is carried by the casing 27 so as to participate in its movements under the action of the lever 32 and when the pin 44 is withdrawn the jaws 38 and 39 may be spread sufficiently to be passed over the tire and then approached until in close relation to the tire where they are held in the approached position by the pin 44.

In the operation of the device in which adjustable parts may be considered as already properly set for a certain size of tire and wheel, the jaws, which may be termed vise jaws, 38 and 39 are applied to the tire and the cup 7 is made fast to the hub portion of the wheel. Now the handle 32 is manipulated in a proper direction to apply force to the tire tending to pull it directly from the rim and this force may be continued about the tire by turning the whole structure mounted on the arm 19 about the axis of the stem 7. Such action readily starts the tire from the rim even though it be tightly stuck thereon to an extent ordinarily requiring the use of prying tools and possibly a hammer or mallet. A tire may be replaced on the rim in a manner similar to but the reverse of the procedure for removing a tire.

The tire tool is adjustable to the diameter of the wheel by loosening the set screws 22 and sliding the extension 21 in or out of the arm 19 as needed. The tire vise made up of the jaws 38 and 39 moves straight outwardly from or inwardly toward the wheel because of the guide afforded by the head 23. The ratchet actuating means serves to lock the vise in its different positions while withdrawing or replacing the tire so as to be unaffected by any spring or elasticity of the tire.

What is claimed is:—

1. An automobile tire tool, comprising means for attachment to the hub portion of an automobile wheel, means for laterally gripping a tire on the wheel, means connecting the first-named means and the gripping means, and means for imparting to the tire-gripping means a movement substantially parallel with the axis of the wheel, whereby a tire may be moved from or onto the wheel rim and the gripping means may be bodily moved about the axis of the wheel.

2. An automobile tire tool, comprising tire-gripping means shaped to laterally embrace the tire, means for actuating the embracing means in a direction to move the tire laterally with respect to the wheel rim, and means attachable to the automobile wheel and connected to the embracing means for guiding said embracing means in a direction circumferential of the wheel.

3. An automobile tire tool, comprising means for engaging the hub portion of an automobile wheel, means for embracing a tire on the automobile wheel and movable circumferentially and laterally thereof, and connections between the tire-embracing means and the hub-engaging means and movable with the tire-embracing means about the axis of the wheel.

4. An automobile tire tool, comprising means attachable to the hub portion of the wheel and having a radial arm movable about the axis of the wheel, embracing means for a tire on the wheel extending laterally therefrom, and connections between the embracing means and the arm and including propelling means for the tire-embracing means for moving the latter in substantial parallelism with the axis of the wheel, said tire-embracing means being also movable circumferentially of the tire, whereby the tire may be forced from or onto the rim progressively.

5. An automobile tire tool, comprising a clamp for attachment to the hub portion of an automobile wheel, an arm mounted on the clamp in radial relation to and movable about the axis of the wheel, a tire-embracing device having opposed jaws for engaging the tire on opposite sides thereof, and means engaging the tire embracing device and carried by the radial arm for moving the tire onto or off the wheel rim in substantial parallelism with the axis of the wheel.

6. An automobile tire tool, comprising a clamp adapted to be secured to the hub portion of an automobile wheel, an arm carried by the clamp in radial relation to the axis of the wheel and movable thereabout, an embracing device for a tire carried by the wheel, and actuating means between the arm and the embracing device for moving the latter together with the tire in a direction substantially parallel with the axis of the wheel.

7. An automobile tire tool, comprising an embracing device having jaws for engaging opposite sides of an automobile tire, and actuating means for the embracing device having means for engaging one side of the wheel and propel the tire-embracing means in the direction substantially parallel with the axis of the wheel.

8. An automobile tire tool, comprising opposed jaws shaped to embrace a wheel tire, said jaws having slidable guide means connecting them, means for locking the jaws in embracing relation to the tire, and means under the control of an operator for moving the jaws bodily when locked together to remove or replace the tire.

9. An automobile tire tool, comprising opposed jaws with guiding means connecting them whereby the jaws may be separated or approached for application to an automobile tire, means for locking the jaws together in the approached position, and means under the control of an operator and engageable with the automobile wheel to move the jaws when locked together bodily away from or toward the wheel to remove or apply the tire to the wheel rim.

10. An automobile tire tool, comprising opposed jaws connected together for sliding movements toward and from each other, means for locking the jaws in the approached position in embracing relation to an automobile tire, and means including a rack and pinion under the control of an operator for moving the jaws bodily when locked together in a direction to remove or apply the automobile tire to the automobile wheel rim.

11. An automobile tire tool, comprising opposed jaws movable toward and from each other and provided with locking means for holding the jaws in the approached position in embracing relation to an automobile tire, a rack and pinion and manipulating means therefor connected to the jaws for the bodily actuation of the latter to move the automobile tire from or onto the wheel rim, and means for attaching the actuating means to the automobile wheel.

12. An automobile tire tool, comprising opposed jaws movable toward and from each other and provided with locking means for holding the jaws in the approached position in embracing relation to an automobile tire, a rack and pinion and manipulating means therefor connected to the jaws for the bodily actuation of the latter to move the automobile tire from or onto the wheel rim, and means for attaching the actuating means to the automobile wheel, said attaching means including a clamp structure adapted to be secured to the hub portion of the wheel.

In testimony that I claim the foregoing as my own, I have hereto affixed my signature.

LOUIS H. OSTERHAGE.